United States Patent
Cui et al.

(10) Patent No.: US 11,635,527 B2
(45) Date of Patent: Apr. 25, 2023

(54) JOINT RECEIVER AND RECEIVING METHOD FOR NAVIGATION SIGNALS LOCATED AT ADJACENT FREQUENCIES

(71) Applicant: TSINGHUA UNIVERSITY, Beijing (CN)

(72) Inventors: Xiaowei Cui, Beijing (CN); Chuhan Wang, Beijing (CN); Tianyi Ma, Beijing (CN); Sihao Zhao, Beijing (CN); Mingquan Lu, Beijing (CN)

(73) Assignee: Tsinghua University, Beijing (CN)

( * ) Notice: Subject to any disclaimer, the term of this patent is extended or adjusted under 35 U.S.C. 154(b) by 443 days.

(21) Appl. No.: 16/651,459

(22) PCT Filed: Sep. 26, 2018

(86) PCT No.: PCT/CN2018/107510
§ 371 (c)(1),
(2) Date: Mar. 27, 2020

(87) PCT Pub. No.: WO2019/062737
PCT Pub. Date: Apr. 4, 2019

(65) Prior Publication Data
US 2020/0301023 A1    Sep. 24, 2020

(30) Foreign Application Priority Data
Sep. 28, 2017   (CN) .......................... 201710895737.8

(51) Int. Cl.
*G01S 19/32*    (2010.01)
(52) U.S. Cl.
CPC ................. *G01S 19/32* (2013.01)
(58) Field of Classification Search
CPC ................. G01S 19/32; G01S 19/33
See application file for complete search history.

(56) References Cited

U.S. PATENT DOCUMENTS

| | | | | |
|---|---|---|---|---|
| 2006/0227905 | A1* | 10/2006 | Kunysz | G01S 19/32 375/345 |
| 2009/0219201 | A1* | 9/2009 | Martin | G01S 19/32 342/357.62 |
| 2013/0021934 | A1* | 1/2013 | Rugamer | H04L 27/2647 370/252 |

FOREIGN PATENT DOCUMENTS

CN         104614739         5/2015

OTHER PUBLICATIONS

Jin, Shuanggen et. Al., "Global Navigation Satellite Systems Signal, Theory and Applications", InTech, 2012 (Year: 2012).*

* cited by examiner

*Primary Examiner* — Cassi J Galt
(74) *Attorney, Agent, or Firm* — Nixon Peabody LLP; Justin D. Swindells

(57) ABSTRACT

It is provided a joint receiver and receiving method for navigation signals located at adjacent frequencies. The joint receiving method includes: receiving a first navigation signal and a second navigation signal which are located at adjacent frequencies (S1); and calculating a frequency estimation of a virtual wideband navigation signal constructed based on the first navigation signal and the second navigation signal (S2), wherein the virtual wideband navigation signal is an asymmetric BOC-like navigation signal having a virtual carrier and a virtual sub-carrier. With the joint receiver and joint receiving method, not only power gain but also bandwidth gain can be obtained, and the ranging precision can be significantly improved.

16 Claims, 5 Drawing Sheets

JOINT RECEIVER AND RECEIVING METHOD FOR NAVIGATION SIGNALS LOCATED AT ADJACENT FREQUENCIES

This patent application is a national stage of International Application No. PCT/CN2018/107510, filed on Sep. 26, 2018, which claims the priority from Chinese Application No. 201710895737.8, filed on Sep. 28, 2017 and titled "Joint Receiver and Receiving Method for Navigation. Signals Located at Adjacent Frequencies." Both of the aforementioned applications are hereby incorporated by reference in their entireties.

TECHNICAL FIELD

The present application relates to the field of satellite navigation, and specifically, a joint receiver and a joint receiving method for navigation signals located at adjacent frequencies.

BACKGROUND

Global Navigation Satellite System (GNSS), namely the GPS, BDS, Galileo and Glonass, as the navigation and positioning technology capable of providing various users with all-weather and all-time PNT services in a global large space dimension based on a joint time-space frame, has become a key global information infrastructure. At present, the modernization and upgrade have been initiated in each of the above four GNSS systems, to provide users with higher-performance and personal navigation services specifically through broadcasting multiple navigation signals of new signal system in the same one frequency band or in different frequency bands.

Usually, multiple navigation signals can be broadcast in the same one frequency band in a navigation system. Some joint receiving methods for navigation signals have been developed to improve the accuracy and stability of tracking.

However, the traditional joint receiving methods for navigation signals are standing in a point that the navigation signals are separate to each other, therefore neither a full exploitation of the potential of signals nor a full use of the nature of separation spectrum could be considered, so that only power gain but also bandwidth gain could be obtained and the ranging performance cannot be further improved.

SUMMARY

The present application is to provide a joint receiver and receiving method for navigation signals located at adjacent frequencies, by which not only power gain but also bandwidth gain can be obtained, and the ranging precision can be significantly improved.

According to another aspect of the present application, a joint receiver for navigation signals located at adjacent frequencies is disclosed. The joint receiver comprises: a receiving unit for receiving a first navigation signal and a second navigation signal which are located at adjacent frequencies; and a processor for calculating a frequency estimation of a virtual wideband navigation signal constructed based on the first navigation signal and the second navigation signal, wherein the virtual wideband navigation signal is an asymmetric BOC-like navigation signal having a virtual carrier and a virtual sub-carrier.

According to an aspect of the present application, a joint receiving method for navigation signals located at adjacent frequencies is disclosed. The joint receiving method for navigation signals located at adjacent frequencies comprises: receiving a first navigation signal and a second navigation signal which are located at adjacent frequencies; and calculating a frequency estimation of a virtual wideband navigation signal constructed based on the first navigation signal and the second navigation signal, wherein the virtual wideband navigation signal is an asymmetric BOC-like navigation signal having a virtual carrier and a virtual sub-carrier.

BRIEF DESCRIPTION OF DRAWINGS

A schematic diagram of a joint receiving method according to an embodiment of the present application is illustrated in FIG. 1;

A schematic diagram of a power spectral density (PSD) of the virtual wideband signal constructed based on a first navigation signal and a second navigation signal according to an embodiment of the present application is illustrated in FIG. 2;

Figure 3:
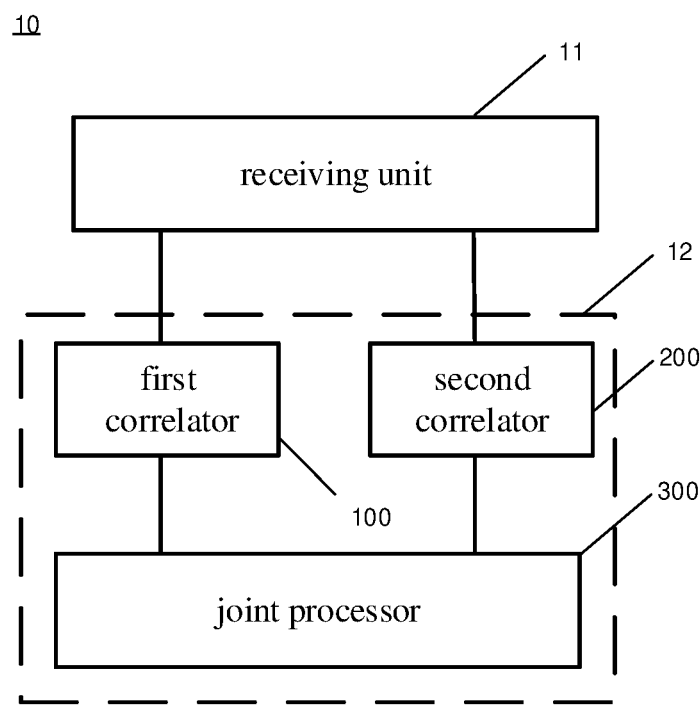
Figure 4:
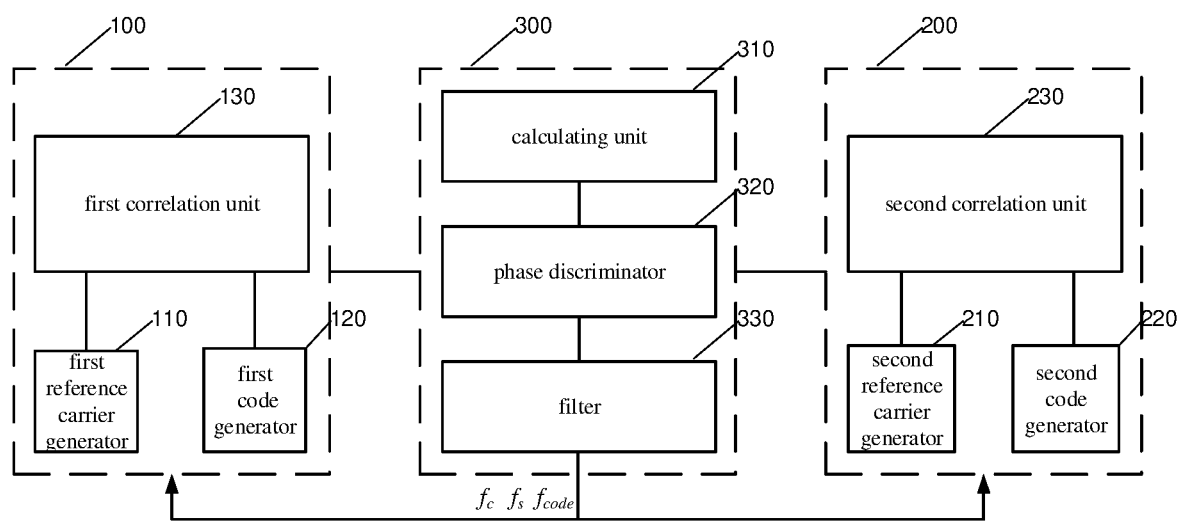
Figure 5:
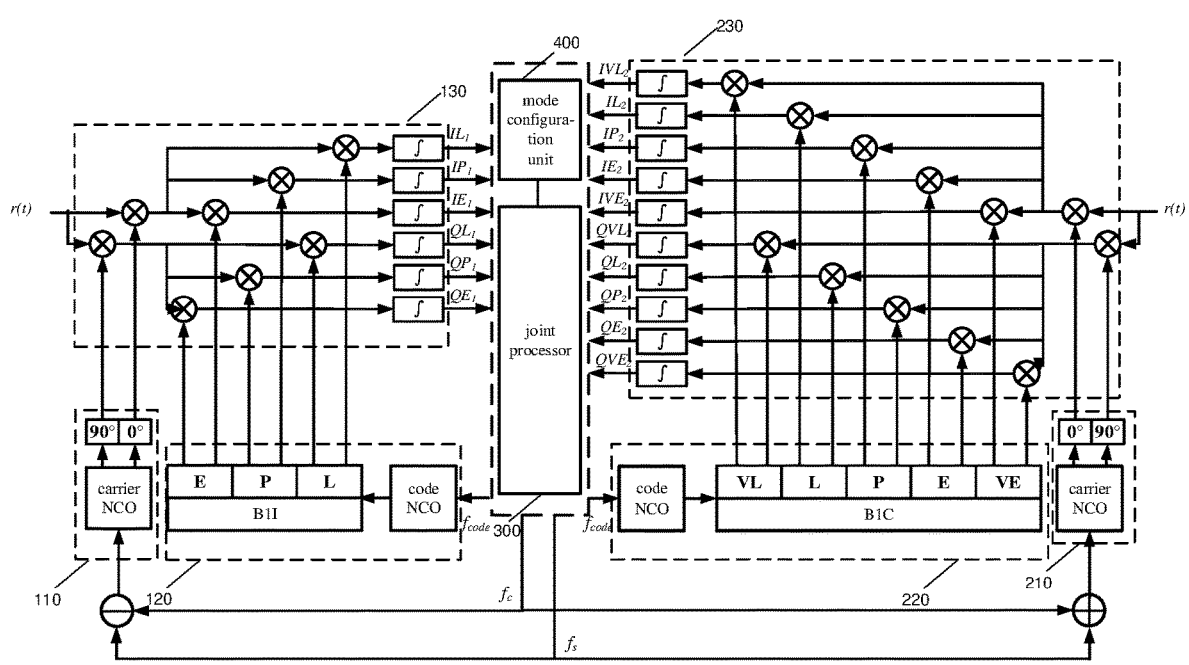
Figure 6:
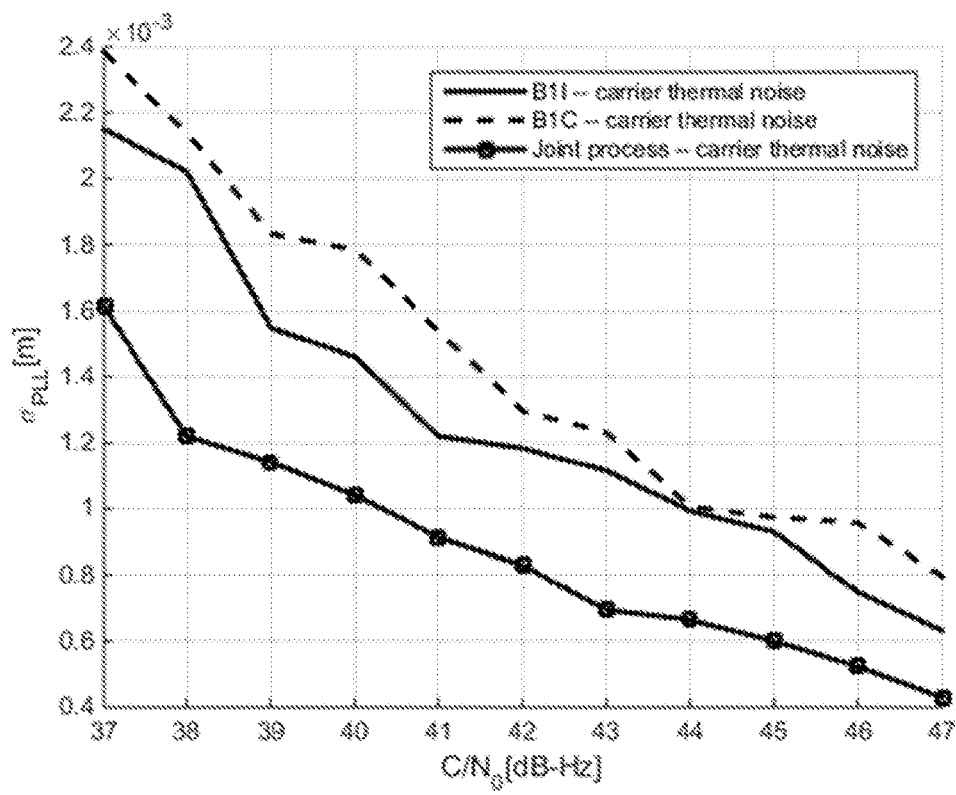
Figure 7:
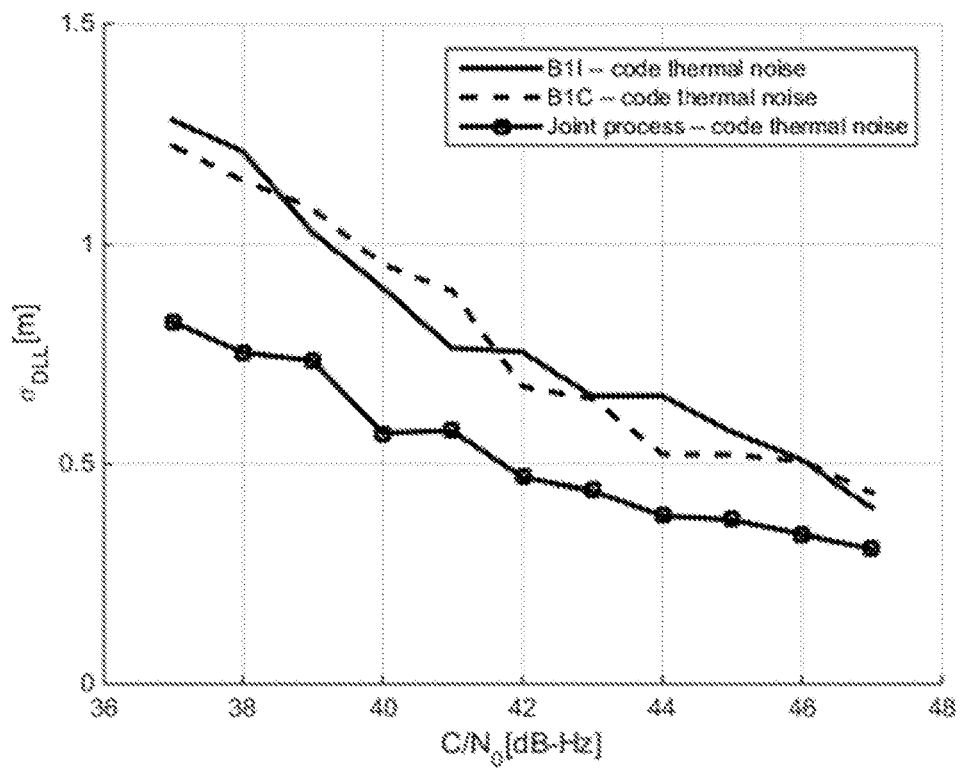
Figure 8:
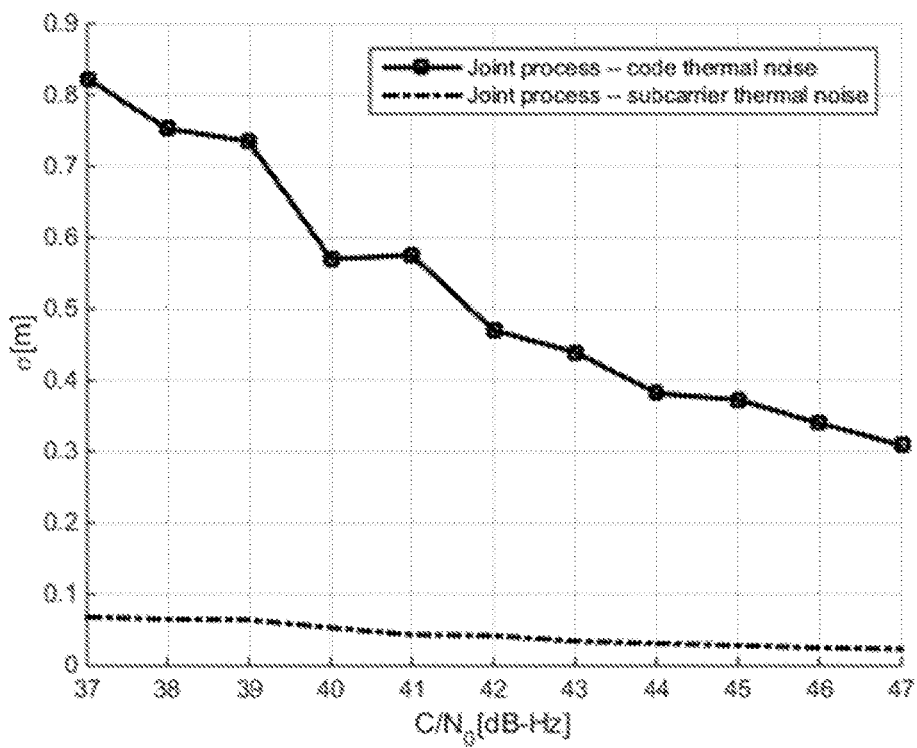
Figure 9:
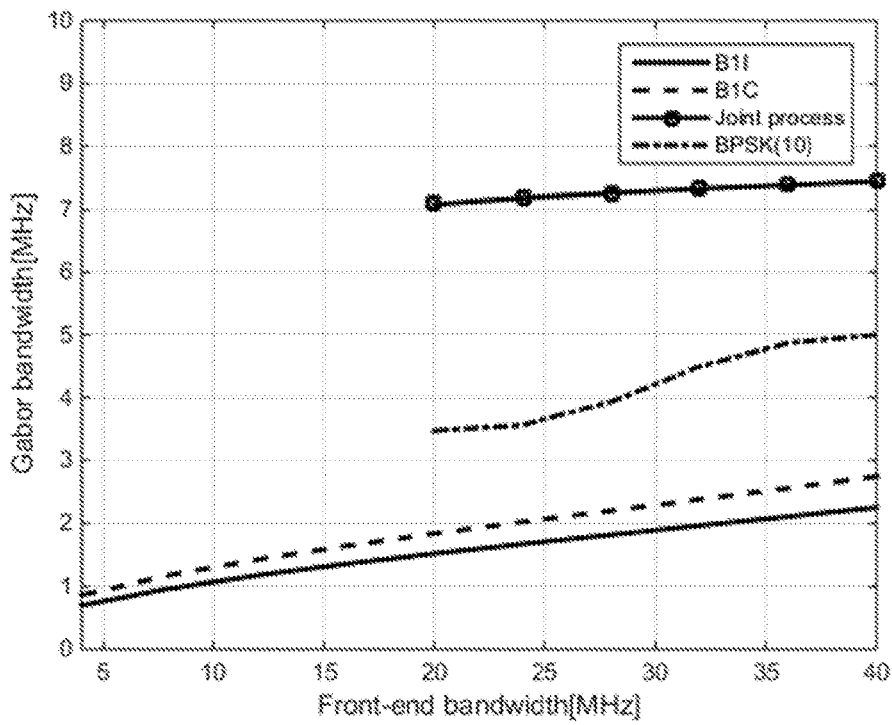

A schematic diagram of a joint receiver for navigation signals located at adjacent frequencies according to an embodiment of the present application is illustrated in FIG. 3;

A schematic diagram of a processor of the joint receiver for navigation signals located at adjacent frequencies according to an embodiment of the present application is illustrated in FIG. 4;

A schematic diagram of a processor of the joint receiver for navigation signals located at adjacent frequencies according to a further embodiment of the present application is illustrated in FIG. 5;

A schematic diagram for comparison of carrier thermal noises of the separate processing of B1I signal, the separate processing of B1C signal and the joint processing according to an embodiment of the present application is illustrated in FIG. 6;

A schematic diagram for comparison of code thermal noises of the separate processing of B1I signal, the separate processing of B1C signal and the joint processing according to an embodiment of the present application is illustrated in FIG. 7;

A schematic diagram for comparison of a code thermal noise and a carrier thermal noise of the joint processing method according to the present application is illustrated in FIG. 8; and A schematic diagram for comparison of Gabor bandwidth result of the virtual wideband signal and Gabor bandwidth results of B1I, B1C, and BPSK(10) modulation signal is illustrated in FIG. 9.

DETAILED DESCRIPTION

Hereinafter, with reference to the appended drawings, a detailed description on a joint receiver and receiving method for navigation signals located at adjacent frequencies according to the present application will be presented. For simplicity, in the description of the embodiments of the present application, the same or similar reference numeral is used for the same or similar device.

Two signals located at adjacent frequencies, i.e., two signals with separate but adjacent center frequencies, may differ in modulation scheme, power, and initial phase relation and can be processed independently by user receivers. However, propagation delays of the two signals from a satellite are nearly identical as they are modulated on adjacent frequencies, share the same reference clock, and undergo nearly identical propagation paths to the receiver, resulting in a strong coherence between the two signals.

Therefore, two signals S1 and S2 as received can be expressed as follows:

$$S1 = A_1 D_1 s_1(t-\tau)\cos(2\pi f_1(t-\tau)+\theta_1), \text{ and}$$

$$S2 = A_2 D_2 s_2(t-\tau)\cos(2\pi f_2(t-\tau)+\theta_2),$$

where $\tau$ denotes a signal propagation delay; $f_1$, $f_2$, $\theta_1$, $\theta_2$, $A_1$, $A_2$, $D_1$, $D_2$ denote received frequencies, carrier initial phases, amplitudes, and messages/sub-codes of first navigation signal and second navigation signal, respectively; $s_1(t-\tau)$ and $s_2(t-\tau)$ denote baseband waveforms of first navigation signal and second navigation signal with ranging code. The received frequencies $f_1$ and $f_2$ equal to a sum of the transmitted nominal frequency and Doppler frequency of the first navigation signal and the second navigation signal, respectively.

According to the present application, the two navigation signals located at adjacent frequencies are jointly received through constructing a virtual wideband signal based on the two signals, which contains a virtual carrier and a virtual sub-carrier as follows:

$$s_{SV}(t-\tau) = A_1 D_1 s_1(t-\tau)\cos(2\pi(f_c-f_s)(t-\tau)+\theta_c-\theta_s) + A_2 D_2 s_2(t-\tau)\cos(2\pi(f_c+f_s)(t-\tau)+\theta_c+\theta_s)$$

It can be seen that the virtual wideband signal as constructed can be regarded as an asymmetric BOC-like signal having a virtual carrier and a virtual sub-carrier. In the virtual wideband signal, $f_c=(f_1+f_2)/2$ is introduced as a virtual carrier frequency, $f_s=(f_2-f_1)/2$ is introduced as a virtual sub-carrier frequency, $\theta_c=(\theta_1+\theta_2)/2$ is introduced as a virtual carrier initial phase, and $\theta_s=(\theta_2-\theta_1)/2$ is introduced as a virtual sub-carrier initial phase. The lower band of the virtual wideband navigation signal which is determined by the first navigation signal is asymmetric with the upper band of the virtual wideband navigation signal which is determined by the second navigation signal.

significant improvement in ranging precision can be obtained compared with the delay estimation in the situation where navigation signals are separately received and processed, such that a great promotion in positioning precision is enabled.

Hereinbelow, taking the B1I signal and B1C signal which are broadcast on the B1 frequency band at adjacent frequencies in the BeiDou Global Navigation System as examples, embodiments of a joint receiver and receiving method for navigation signals located at adjacent frequencies according to the present application will be described. As can be understood, the joint receiver and receiving method for navigation signals located at adjacent frequencies according to the present application can be used for not only the B1I and B1C signals but also any two navigation signals located at adjacent frequencies in the same one frequency band, such as the L2C and L5 signals of GPS, the E5 and E6-BC signals of Galileo.

In the future BeiDou Global Navigation System, two civilian signals, i.e., the B1I signal and B1C signal, will be broadcast on the B1 frequency band. In a perspective of usage, the B1I signal and the B1C signal are designed independently and are expected to be processed in receivers as two separate signals. The B1I signal has been a major civilian signal of the BeiDou regional system and will be retained in the BeiDou global system for legacy users, and the new B1C signal has a compatible interoperability with the GPS L1C and Galileo E1 OS signals such that the better performance in ranging and positioning can be obtained.

The B1I signal and the B1C signal are separately located at two different but adjacent frequencies. The B1I signal has an center frequency of 1561.098 MHz, a modulation mode of BPSK(2), and a period of 1 ms. The new B1C signal has a modulation mode of QMBOC(6,1,4/33), and a period of 10 ms. Signal parameters of B1I and B1C signals are illustrated in the table as below.

| | | Signal Parameters of B1I/B1C | | | | | |
|---|---|---|---|---|---|---|---|
| Signal | Component | Central Frequency/ MHz | Modulation Mode | Phase/° | Power Ratio | Sub-carrier/ MHz | Pseudocode/ Mcps |
| B1I | — | 1561.098 | BPSK(2) | 0 | 1/2 | — | 2.046 |
| B1C | pilot | 1575.42 | QMBOC | 0 | 3/8 | 1.023/6.138 | 1.023 |
| | data | 1575.42 | BOC(1, 1) | 0 | 1/8 | 1.023 | 1.023 |

Figure 1:
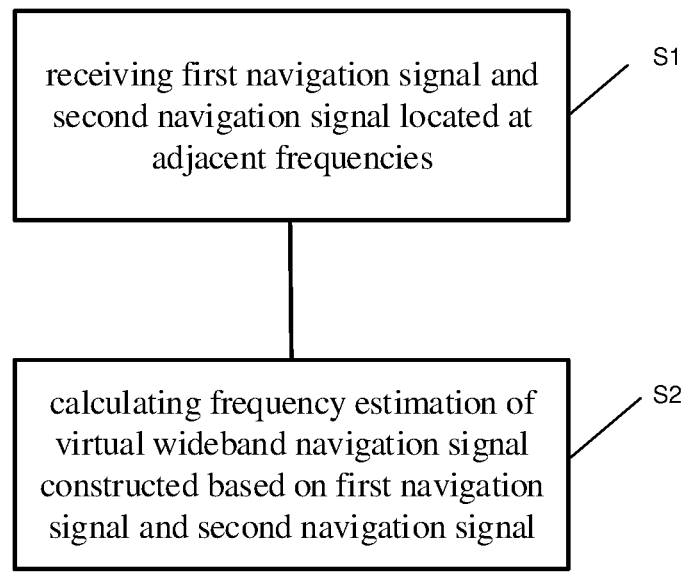

FIG. 1 shows a schematic diagram of a joint receiving method according to an embodiment of the present application. The receiving method includes receiving a first navigation signal and a second navigation signal which are located at adjacent frequencies in S1, and calculating a frequency estimation of a virtual wideband navigation signal constructed based on the first navigation signal and the second navigation signal in S2. The virtual wideband navigation signal is an asymmetric BOC-like navigation signal having a virtual carrier and a virtual sub-carrier. Through constructing the virtual wideband asymmetric BOC-like signal, by the means of compensating the asymmetry of the virtual wideband signal, a frequency estimation can be obtained based on the constructed virtual wideband signal. It is thereby practical of obtaining a high-precision delay estimation of navigation based on the frequency estimation, such as the virtual sub-carrier frequency estimation, the virtual carrier frequency estimation and/or the code frequency estimation, of the virtual wideband signal. Here, a The B1I signal and the B1C signal are located at adjacent frequencies in the same frequency band of B1. The B1I signal and the B1C signal as received can be expressed as follows:

$$s_{B1I}(t-\tau) = A_1 D_1 s_1(t-\tau)\cos(2\pi f_1(t-\tau)+\theta_1),$$

$$s_{B1C}(t-\tau) = A_2 D_2 s_2(t-\tau)\cos(2\pi f_2(t-\tau)+\theta_2)$$

where $\tau$ denotes a signal propagation delay; $f_1$, $f_2$, $\theta_1$, $\theta_2$, $A_1$, $A_2$, $D_1$, $D_2$ denote received frequencies, carrier initial phases, amplitudes, and messages/sub-codes of B1I signal and B1C signal, respectively; $s_1(t-\tau)$ and $s_2(t-\tau)$ denote baseband waveforms of B1I signal and B1C signal with ranging code. The received frequencies $f_1$ and $f_2$ equal to a sum of the transmitted nominal frequency and Doppler frequency of B1I signal and B1C signal, respectively.

According to an embodiment of the present application, a virtual wideband signal may be constructed based on the first navigation signal B1I and the second navigation signal B1C, which is expressed as follows:

$$s_{VS}(t-\tau) =$$
$$s_{B1I}(t-\tau) + s_{B1C}(t-\tau) = A_1 D_1 s_1(t-\tau)\cos(2\pi(f_c - f_s)(t-\tau) + \theta_c - \theta_s) +$$
$$A_2 D_2 s_2(t-\tau)\cos(2\pi(f_c + f_s)(t-\tau) + \theta_c + \theta_s).$$

where $f_c=(f_1+f_2)/2$ is introduced as the virtual carrier frequency, $f_s=(f_2-f_1)/2$ is introduced as the virtual sub-carrier frequency, $\theta_c=(\theta_1+\theta_2)/2$ is introduced as the virtual carrier initial phase, and $\theta_s=(\theta_2-\theta_1)/2$ is introduced as a virtual sub-carrier initial phase.

Figure 2:
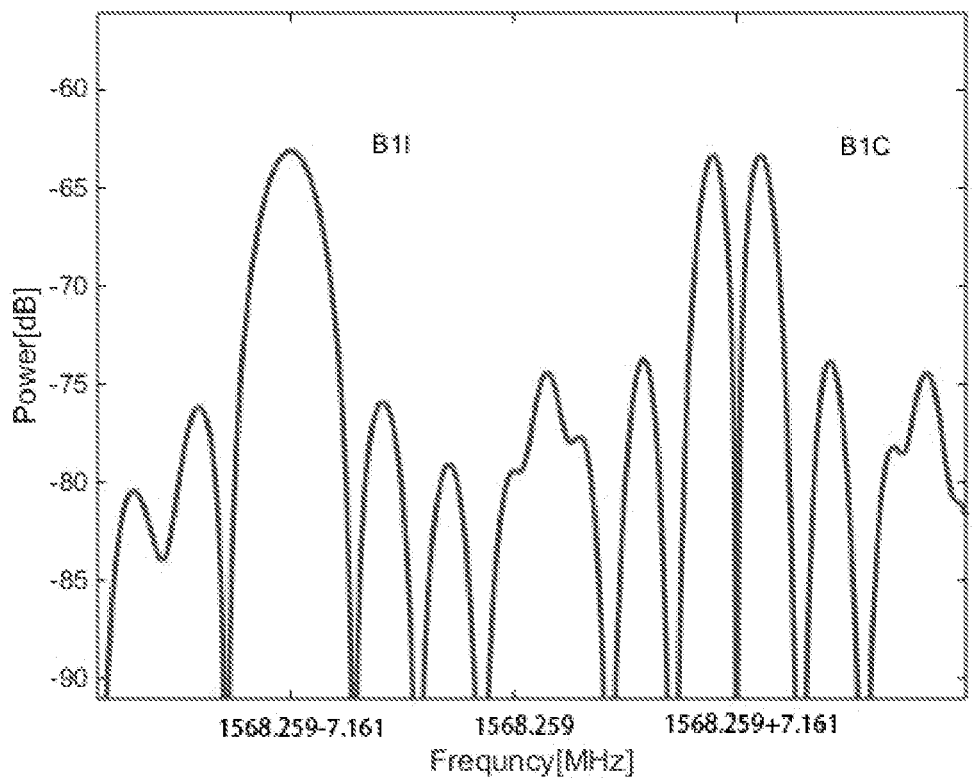

A schematic diagram of a power spectral density (PSD) of the virtual wideband signal constructed based on the B1I signal and the B1C signal is illustrated in FIG. 2. As illustrated in FIG. 2, the virtual wideband signal may have a carrier frequency $f_c$ of 1568.259 MHz, and the frequency spectrum of the virtual wideband signal exhibits an asymmetry. The sub-carrier frequency $f_s$ of the virtual wideband signal represents half the center frequency spacing between the B1I signal and the B1C signal, i.e., 7.161 MHz. Two components, B1I and B1C, are modulated on the lower and upper sidebands, respectively.

According to an embodiment of the present application, through constructing the virtual asymmetric BOC-like navigation signal, a full use of the nature of separated frequency spectrum of frequency band of B1I and B1C is achieved so as to put into use a greater Gabor band width and more power in frequency band, and hence, compared with the separate tracking of two signals, the thermal noise error can be reduced, the ranging precision can be improvement, and the increase in bandwidth can be achieved.

Although the virtual wideband signal has characteristics similar to that of the BOC signal, it is very difficult to obtain and generate the true subcarrier waveform due to the two components of the virtual wideband signal with unequal power and different modulation schemes, for which it is impossible to apply those techniques for receiving BOC signals that need to generate local subcarrier waveforms to the virtual wideband signal. According to an embodiment of the present application, a novel joint receiver is illustrated in FIG. 3. As illustrated in FIG. 3, a joint receiver 10 for navigation signals located at adjacent frequencies may include a receiving unit 11 for receiving the first navigation signal and the second navigation signal located at adjacent frequencies, and a processor 12 for calculating a frequency estimation of a virtual wideband navigation signal constructed based on the first navigation signal and the second navigation signal, wherein the virtual wideband navigation signal is an asymmetric BOC-like navigation signal having a virtual carrier and a virtual sub-carrier.

The processor 12 may include a first correlator 100, a second correlator 200, and a joint processor 300.

The first correlator 100 may generate a local replica of the first navigation signal and correlates the local replica of first navigation signal against the first navigation signal as received, so as to obtain first navigation signal correlations.

The second correlator 200 may generate a local replica of the second navigation signal and correlates the local replica of second navigation signal against the second navigation signal as received, so as to obtain second navigation signal correlations.

The joint processor 300 may conduct pre-processing with the first navigation signal correlations and the second navigation signal correlations to compensate the asymmetry of the virtual wideband navigation signal. For example, the joint processor 300 may conduct a power compensation and a message/sub-code segregation to the first navigation signal correlations and the second navigation signal correlations, so as to compensate the asymmetry of the virtual wideband navigation signal. The pre-processing correlations are combined by the joint processor 300 to decouple the virtual carrier and the virtual sub-carrier of the virtual wideband navigation signal. The joint processor 300 may calculate the virtual carrier frequency estimation, the virtual sub-carrier frequency estimation and the code frequency estimation of the virtual wideband navigation signal based on the combined pre-processing correlations. The virtual carrier frequency estimation, the virtual sub-carrier frequency estimation and the code frequency estimation can be fed back by the joint processor to the first correlator and second correlator for generating the local replica of the first navigation signal and the local replica of the second navigation signal.

A schematic diagram of a processor of the joint receiver for navigation signals located at adjacent frequencies according to an embodiment of the present application is illustrated in FIG. 4. In the figure, the B1 signal and the B1C signal are still taken as examples for navigation signals located at adjacent frequencies.

The first correlator 100 may comprise a first reference carrier generator 110, a first code generator 120, and a first correlation unit 130.

Since the first navigation signal B1I has a modulation mode of BPSK, a BPSK-like correlator framework may be adopted for the first correlator here, so that a prompt correlation and a set of early and late correlations of I branch and a prompt correlation and a set of early and late correlations of Q branch could be obtained.

The first reference carrier generator 110 may generate a local replica of the first navigation signal reference carrier signal based on a feedback of the joint processor 300. For example, the first reference carrier generator 110 may combine a virtual sub-carrier frequency estimation $f_s$ and a virtual carrier frequency estimation $\hat{f}_c$ which are fed back by the joint processor 300 such that a first signal frequency estimation $\hat{f}_1 = \hat{f}_c - \hat{f}_s$ is obtained, so as to drive a carrier numerically-controlled oscillator (Carrier NCO) of the first reference carrier generator to generate local reference carrier signals of I branch and Q branch.

The first code carrier generator 120 may generate a local replica of the first navigation signal reference code signal based on a feedback of the joint processor 300. For example, through a pseudocode frequency estimation $\hat{f}_{code}$ which is fed back by the joint processor 300, the first reference code generator 120 may drive a pseudocode numerically-controlled oscillator (Code NCO) of the first reference code generator to generate an early, a prompt and a late reference code signals of first navigation signal.

The first correlation unit 130 may correlate the local replica of the first navigation signal (which includes the local replica of the first navigation signal reference carrier signal and the local replica of the first navigation signal reference code signal) against the navigation signal as received, so as to generate a prompt correlation $IP_1$ and a set of early and late correlations $IE_1$, $IL_1$ of I branch, and a prompt correlation $QP_1$ and a set of early and late correlations $QE_1$, $QL_1$ of Q branch, and $$IE_1 \approx A_1 D_1 R_1(\Delta\tau - d_1/2)T \sin c(\alpha)\cos(\alpha + \Delta\theta_c - \Delta\theta_s),$$

$$QE_1 \approx A_1 D_1 R_1(\Delta\tau - d_1/2)T \sin c(\alpha)\sin(\alpha + \Delta\theta_c - \Delta\theta_s),$$

$IP_1 \approx A_1 D_1 R_1(\Delta\tau) T \sin c(\alpha)\cos(\alpha+\Delta\theta_c-\Delta\theta_s),$ $QP_1 \approx A_1 D_1 R_1(\Delta\tau) T \sin c(\alpha)\sin(\alpha+\Delta\theta_c-\Delta\theta_s),$ $IL_1 \approx A_1 D_1 R_1(\Delta\tau+d_1/2) T \sin c(\alpha)\cos(\alpha+\Delta\theta_c-\Delta\theta_s),$ and $QL_1 \approx A_1 D_1 R_1(\Delta\tau+d_1/2) T \sin c(\alpha)\sin(\alpha+\Delta\theta_c-\Delta\theta_s),$ where $A_1$ denotes an amplitude of first navigation signal, $D_1$ denotes a message bit of first navigation signal, $R_1$ denotes a pseudocode autocorrelation function of first navigation signal, $\Delta\tau$ denotes an error in code phase estimation, $\Delta\theta_c$ denotes an error in carrier phase estimation, $\Delta\theta_s$ denotes an error in virtual sub-carrier phase estimation, $d_1$ denotes an spacing between an early correlator and a late correlator of first navigation, and T denotes a duration for integration, a is used for the brevity of the above equations, and $\alpha=\pi(\Delta f_c-\Delta f_s)T$, where $\Delta f_s$ denotes an error in virtual sub-carrier frequency estimation and $\Delta f_c$ an error in virtual carrier frequency estimation.

The second correlator 200 may comprise a second reference carrier generator 210, a second code generator 220, and a second correlation unit 230.

Since the second navigation signal B1C has a modulation mode of BOC, where a sub-carrier is involved, a BOC-like correlator framework may be adopted for the second correlator here, so that a prompt correlation of I branch and two sets of early and late correlations (a very early, an early, a late, and a very late correlations) of I branch and a prompt correlation of Q branch and two sets of early and late correlations (a very early, an early, a late, and a very late correlations) of Q branch may be generated.

The second reference carrier generator 210 may generate a local replica of the second navigation signal reference carrier signal based on a feedback of the joint processor 300. For example, the second reference carrier generator 210 may combine the virtual sub-carrier frequency estimation $\hat{f}_s$ and the virtual carrier frequency estimation $\hat{f}_c$ which are fed back by the joint processor 300 such that a second signal frequency estimation $\hat{f}_2=\hat{f}_c+\hat{f}_s$ is obtained, so as to drive a carrier numerically-controlled oscillator (Carrier NCO) of the second reference carrier generator to generate local reference carrier signals of I branch and Q branch.

The second code carrier generator 220 may generate a local replica of the second navigation signal reference code signal based on a feedback of the joint processor 300. For example, through a pseudocode frequency estimation $\hat{f}_{code}$ which is fed back by the joint processor 300, the second reference code generator 220 may drive a pseudocode numerically-controlled oscillator (Code NCO) of the second reference code generator to generate a very early, an early, a prompt, a late and a very late reference code signals of second navigation signal.

The second correlation unit 230 may correlate the local replica of second navigation signal (which includes the local replica of the second navigation signal reference carrier signal and the local replica of the second navigation signal reference code signal) against the navigation signal as received, so as to generate a prompt correlation $IP_2$ of I branch and a very early, an early, a prompt, a late, and a very late correlations $IVE_2$, $IE_2$, $IL_2$, $IVL_2$ of I branch and a prompt correlation $QP_2$ of Q branch and a very early, an early, a prompt, a late and a very late correlations $QVE_2$, $QE_2$, $QL_2$, $QVL_2$ of Q branch, and $IVE_2 \approx A_2 D_2 R_2(\Delta\tau-d_2)T \sin c(\beta)\cos(\beta+\Delta\theta+\Delta\varphi),$ $QVE_2 \approx A_2 D_2 R_2(\Delta\tau-d_2)T \sin c(\beta)\sin(\beta+\Delta\theta+\Delta\varphi),$ $IE_2 \approx A_2 D_2 R_2(\Delta\tau-d_2/2)T \sin c(\beta)\cos(\beta+\Delta\theta+\Delta\varphi),$ $QE_2 \approx A_2 D_2 R_2(\Delta\tau-d_2/2)T \sin c(\beta)\sin(\beta+\Delta\theta_c+\Delta\theta_s)$ $IP_2 \approx A_2 D_2 R_2(\Delta\tau)T \sin c(\beta)\cos(\beta+\Delta\theta_c+\Delta\theta_s),$ $QP_2 \approx A_2 D_2 R_2(\Delta\tau)T \sin c(\beta)\sin(+\Delta\theta_c+\Delta\theta_s),$ $IL_2 \approx A_2 D_2 R_2(\Delta\tau+d_2/2)T \sin c(\beta)\cos(\beta+\Delta\theta_c+\Delta\theta_s),$ $QL_2 \approx A_2 D_2 R_2(\Delta\tau+d_2/2)T \sin c(\beta)\sin(\beta+\Delta\theta_c+\Delta\theta_s),$ $IVL_2 \approx A_2 D_2 R_2(A_T+d_2)T \sin c(\beta)\cos(\beta+\Delta\theta_c+\Delta\theta_s),$ and $QVL_2 \approx A_2 D_2 R_2(\Delta\tau+d_2)T \sin c(\beta)\sin(\beta+\Delta\theta_c+\Delta\theta_s),$ where $A_2$ denotes an amplitude of second navigation signal, $D_2$ denotes a message bit of second navigation signal, $R_2$ denotes a pseudocode autocorrelation function of second navigation signal, $\Delta\tau$ denotes an error in code phase estimation, $\Delta\theta_c$ denotes an error in carrier phase estimation, $\Delta\theta_s$ denotes an error in virtual sub-carrier phase estimation, $d_2$ denotes a spacing between an early correlator and a late correlator of second navigation, and T denotes a duration for integration, $\beta$ is used for the brevity of the above equations, and $\beta=\pi(\Delta f_c+\Delta f_s)T$, where $\Delta f_s$ denotes an error in virtual sub-carrier frequency estimation and $\Delta f_c$ denotes an error in virtual carrier frequency estimation.

The first navigation signal correlation of the first correlator 100 and the second navigation signal correlation of the second correlator 200 can be provided to the joint processor 300, respectively. The joint processor 300 can be responsible for combining the outputs of the two correlators coherently or non-coherently, forming the discriminator outputs of the code, subcarrier, and carrier, and filtering them. The outputs of the joint processor 300 can be fed back to the processors 100 and 200 for correcting the Code NCO and Carrier NCO of the two signals so as to generate a local replica of reference signal. Three kinds of measurements, the virtual carrier frequency estimation, the virtual sub-carrier frequency estimation and/or the code frequency estimation of the virtual wideband navigation signal can be obtained by the joint processor 300.

According to an embodiment, the joint processor 300 includes a calculating unit 310, a phase discriminator 320 and a filter 330 as shown in FIG. 4.

Since the lower band of the virtual wideband navigation signal modulated with the first navigation signal and the upper band of the virtual wideband navigation signal modulated with the second navigation signal are of asymmetry, a pre-processing is conducted by the calculating unit 310 to compensate the asymmetry.

According to an embodiment, the first navigation signal correlations and the second navigation signal correlations are conducted to a power compensation of the pre-processing. Taking correlations $IP_1$, $QP_1$, $IP_2$, $QP_2$ of prompt branch of first navigation signal and second navigation signal as examples, as can be seen, the amplitudes $A_1$ and $A_2$ of correlations, the autocorrelation functions $R_1(\Delta\tau)$ and $R_2(\Delta\tau)$, and parameters $\alpha$ and $\beta$ should be put into consideration for the power compensation.

Assuming that the tracking enters into a stable state, the code loop is in a locking state, which means that $\Delta\tau\approx0$, and, as a result, $R_1(\Delta\tau)\approx1$ and $R_2(\Delta\tau)\approx1$, and, meanwhile, $\alpha\approx0$ and $\beta\approx0$, and as a result, $\sin c(\alpha)\approx1$ and $\sin c(\beta)\approx1$. At the moment, the effect by the difference from each other of the autocorrelation functions $R_1(\Delta\tau)$ and $R_2(\Delta\tau)$, and of parameters $\alpha$ and $\beta$ of first navigation signal and second navigation signal can be neglected, and therefore, merely the difference from each other of the amplitudes $A_1$ and $A_2$ of correlations of first navigation signal and second navigation signal should be put into consideration.

According to an embodiment, a nominal amplitude ratio $A_1/A_2$ of first navigation signal and second navigation signal can be used as an adjustment coefficient $\gamma$. For example, for the B1I signal and the B1C signal, based on a nominal amplitude ratio of the two signals, an adjustment coefficient $\gamma=2:\sqrt{3}$ can be obtained, and with the adjustment coefficient $\gamma$, the first navigation signal correlation can be adjusted so as to enable the power compensation for the first navigation signal correlation and the second navigation signal correlation. Alternatively, since the two navigation signals have similar noise environments, a real-time carrier-to-noise ratio which is obtained by actual measurement for any of the two navigation signals can be used as the amplitude ratio $A_1/A_2$ of first navigation signal and second navigation signal so as to enable the power compensation.

Generally, a navigation signal is modulated with a message or sub-code, and thus corresponding navigation correlations may flip over due to the effect by the message (or sub-code) for modulation, for which a message (or sub-code) segregation should be performed before the joint phase discrimination so as to eliminate the effect of flip-over due to the message (or sub-code). In the present embodiment, the first navigation signal B1I contains merely a data channel modulated with a navigation message, and thus a message segregation could be conducted.

In case of a high signal-to-noise ratio, it is possible to obtain a message bit estimation $\tilde{D}_1$ through a data demodulation of B1I channel, so as to conduct the message segregation based on the message bit estimation $\tilde{D}_1$.

Alternatively, the message segregation may be conducted with a message bit estimation $\tilde{D}_1$ which is provided by an external auxiliary system.

The second navigation signal B1C contains a pilot channel. A sub-code $\tilde{D}_2$ modulated in the pilot channel is generally known and thus can be directly segregated.

For example, the first navigation signal prompt correlation and the second navigation signal prompt correlation is subjected to a power compensation and message/sub-code segregation to obtain the pre-processing correlations as $\tilde{D}_1 IP_1$, $\tilde{D}_1 QP_1$, $\gamma \tilde{D}_2 IP_2$ and $\gamma \tilde{D}_2 QP_2$, respectively.

The pre-processing correlations are combined by the calculating unit 310 of the joint processor 300, so as to decouple the virtual carrier and the virtual sub-carrier as follows:

$$\gamma \tilde{D}_2 QP_2 - \tilde{D}_1 QP_1 \approx 2A_1 T \cos(\Delta f_c T + \Delta \theta_c) \sin(\pi \Delta f_s T + \Delta \theta_s),$$

$$\gamma D_2 QP_2 + D_1 QP_1 \approx 2A_1 T \cos(\pi \Delta f_s T + \Delta \theta_s) \sin(\pi \Delta f_c T + \Delta \theta_c),$$

$$\gamma D_2 QP_2 + D_1 IP_1 \approx 2A_1 T \cos(\pi \Delta f_c T + \Delta \theta_c) \cos(\pi \Delta f_s T + \Delta \theta_s).$$

The combined pre-processing correlations could be conducted to a phase discrimination by the phase discriminator 320 and the filter 330, so as to obtain the virtual carrier frequency estimation, the virtual sub-carrier frequency estimation and the code frequency estimation of the virtual wideband navigation signal.

The phase discriminator 320 may include a carrier phase discriminator, a sub-carrier phase discriminator, and a code phase discriminator. The filter 330 may include a carrier filter, a sub-carrier filter, and a code filter.

By joint processing of the combined pre-processing results, the decoupling between the virtual carrier and the virtual sub-carrier could be realized, so that a virtual carrier phase discrimination and a virtual sub-carrier phase discrimination can be performed by the phase discriminator (for example, the carrier phase discriminator and the sub-carrier phase discriminator). For example, the virtual carrier phase discrimination and the virtual sub-carrier phase discrimination can be performed by using a pure PLL four-quadrant phase discriminator as follows:

$$\text{disc}(\theta_c) = \text{atan2}(\gamma \tilde{D}_2 QP_2 + \tilde{D}_1 QP_1, \gamma IP_2 + \tilde{D}_1 IP_1) \approx \pi \Delta f_c T + \Delta \theta_c,$$

$$\text{disc}(\theta_s) = \text{atan2}(\gamma \tilde{D}_2 QP_2 - \tilde{D}_1 QP_1, \gamma IP_2 + \tilde{D}_1 IP_1) \approx \Delta f_s T + \Delta \theta_s$$

Results of virtual carrier phase discrimination and virtual sub-carrier phase discrimination may be filtered by using the filter 330, for example, the carrier filter and the sub-carrier filter, to obtain a virtual carrier frequency estimation and a virtual sub-carrier frequency estimation as below:

$$\text{disc}(\theta_s) \to \hat{f}_s,$$

$$\text{disc}(\theta_c) \to \hat{f}_c.$$

As mentioned hereinabove, the correlations as obtained may comprise a prompt correlation and an early and late correlations of first navigation signal and a prompt correlation and an early and late correlations of second navigation signal. Therefore, the error in code phase $\Delta \tau$ may be obtained by using the phase discriminator (for example, the code phase discriminator), such that the code frequency estimation can be obtained after filtering by the code filter.

According to an embodiment of the present application, the code phase discriminator of the phase discriminator 320 may perform a first code phase discrimination according to the first navigation signal correlations and perform a second code phase discrimination according to the second navigation signal correlations. A result of first code phase discrimination and a result of second code phase discrimination are combined together considering the asymmetry of the virtual wideband navigation signal, for example, in consideration of a main peak gradient $k_1$ of the autocorrelation function $R_1$ of first navigation signal correlation, a main peak gradient $k_2$ of the autocorrelation function $R_2$ of second navigation signal correlation, a spacing $d_1$ between early and late correlators of first navigation signal correlation and a spacing $d_2$ between early and late correlators of second navigation signal correlation.

According to an embodiment, a coherent phase discriminator, for example, a coherent phase discriminator, may be used as the code phase discriminator. A result of coherent phase discrimination can be expressed as follows:

$$\text{disc}(\tau) = \frac{1}{2} \frac{2 - k_1 d_1}{4 k_1} \frac{IE_1 - IL_1}{IP_1} + \frac{1}{2} \frac{2 - k_2 d_2}{4 k_2} \frac{IE_2 - IL_2}{IP_2},$$

where $d_1$ stands for a spacing between an early correlation and a late correlation of first navigation signal, $k_1$ a main peak gradient of autocorrelation function of first navigation signal, $d_2$ a spacing between an early correlation and a late correlation of second navigation signal, and $k_2$ a main peak gradient of autocorrelation function of second navigation signal.

If the carrier to noise ratio of B1I and B1C signals could be considered, the result of coherent phase discrimination can be expressed as follows:

$$\mathrm{disc}(\tau) = \frac{(C/N_0)_1}{(C/N_0)_1 + (C/N_0)_2} \frac{2-k_1 d_1}{4k_1} \frac{IE_1 - IL_1}{IP_1} +$$

$$\frac{(C/N_0)_2}{(C/N_0)_1 + (C/N_0)_2} \frac{2-k_2 d_2}{4k_2} \frac{IE_2 - IL_2}{IP_2},$$

where $(C/N_0)_1$ and $(C/N_0)_2$ the carrier to noise ratio of B1I and B1C signals.

As can be understood, correlations are included both in denominators and numerators, the power compensation and message/sub-code segregation of the correlations in denominators and numerators can be canceled out by each other, and therefore, in the code phase discriminator, correlations after being subjected to a power compensation and message/sub-code segregation can be adopted and also the first navigation signal correlation and the second navigation signal correlation can be directly adopted.

Alternatively, an incoherent phase discriminator, for example, an early-late-power-difference phase discriminator, may be used as the code phase discriminator. A result of coherent phase discrimination can be expressed as follows:

$$\mathrm{disc}(\Delta\tau) =$$

$$\frac{1}{2}\frac{2-k_1 d_1}{4k_1} \frac{IE_1^2 + QE_1^2 - IL_1^2 - QL_1^2}{IE_1^2 + QE_1^2 + IL_1^2 + QL_1^2} + \frac{1}{2}\frac{2-k_2 d_2}{4k_2} \frac{IE_2^2 + QE_2^2 - IL_2^2 - QL_2^2}{IE_2^2 + QE_2^2 + IL_2^2 + QL_2^2}.$$

If the carrier to noise ratio of B1I and B1C signals could be considered, the result of coherent phase discrimination can be expressed as follows:

$$\mathrm{disc}(\Delta\tau) = \frac{(C/N_0)_1}{(C/N_0)_1 + (C/N_0)_2} \frac{2-k_1 d_1}{4k_1} \frac{IE_1^2 + QE_1^2 - IL_1^2 - QL_1^2}{IE_1^2 + QE_1^2 + IL_1^2 + QL_1^2} +$$

$$\frac{(C/N_0)_2}{(C/N_0)_1 + (C/N_0)_2} \frac{2-k_2 d_2}{4k_2} \frac{IE_2^2 + QE_2^2 - IL_2^2 - QL_2^2}{IE_2^2 + QE_2^2 + IL_2^2 + QL_2^2},$$

where $(C/N_0)_1$ and $(C/N_0)_2$ the carrier to noise ratio of B1I and B1C signals.

The result of the phase discriminator 320 may be filtered by the code filter 330 to obtain a pseudocode frequency estimation $\hat{f}_{code}$ as below:

$$\mathrm{disc}(\tau) \rightarrow \hat{f}_{code}$$

The above results of estimation may be fed back to the first correlator and the second correlator, for obtaining the local replica of first navigation signal and the local replica of second navigation signal.

It is understood that a sub-carrier phase estimation and a code phase estimation can be obtained according to the virtual carrier frequency estimation, the virtual sub-carrier frequency estimation, the code frequency estimation of the virtual wideband navigation signal. With an assistance by the sub-carrier phase estimation to a code phase estimation using such manners as the unambiguous combination, a delay estimation with higher precision of navigation signal can be obtained. Here, only power gain but also bandwidth gain could be obtained and a significant improvement in ranging precision can be achieved compared with the delay estimation in the situation where navigation signals are separately received and processed.

A schematic diagram of a processor of the joint receiver for navigation signals located at adjacent frequencies according to a further embodiment of the present application is illustrated in FIG. 5. As illustrated in FIG. 5, the receiver according to the present embodiment may further comprise a mode configuration unit 400 for determining an operation mode for the joint processor 300, and specifically, for instructing the joint processor 300 to operate in a joint processing mode or in a separate processing mode. The mode configuration unit 400 may be located inside the joint processor 300, and, alternatively, may be located outside the joint processor 300.

The mode configuration unit 400 may determine the operation mode for the joint processor 300 according to a current status for tracking navigation signals. For example, in an initial status where errors in estimation, usually, are relatively great, the joint processor 300 can be configured to operate in the separate processing mode, and with the entry of the separate processing operation mode into a stable state, the joint processor 300 can be switched to the joint processing mode. If, in the joint processing mode, the tracking is failed due to narrow-band interferences, the mode configuration unit can instruct the joint processor 300 to switched to the separate processing mode until the interferences disappear when the joint processor 300 will be changed back.

When the mode configuration unit 400 instructs the joint processor 300 to operate in the joint processing mode, the joint processor 300 performs a joint processing of the virtual wideband navigation signal, so as to obtain the virtual carrier frequency estimation, the virtual sub-carrier frequency estimation and the code frequency estimation of virtual wideband navigation signal according to the combined pre-processing correlations.

When the mode configuration unit 400 instructs the joint processor 300 to operate in the separate processing mode, the joint processor obtains a carrier frequency estimation and a code frequency estimation of first navigation signal according to the first navigation signal correlations and obtains a carrier frequency estimation and a code frequency estimation of second navigation signal according to the second navigation signal correlations. As such, a code phase estimation of first navigation signal can be obtained for tracking the first navigation signal, and a code phase estimation of second navigation signal can be obtained for tracking the second navigation signal.

With the receiver framework according to an embodiment of the present application, it is ensured that the receiver can be switched in a stable manner without increasing hardware costs so as to achieve the balance and compromise between the performance in ranging and capacity of resisting disturbance.

Hereinbelow, in combination of a specific usage scenario, the thermal noise performance of the receiver and receiving method according to the present application will be analyzed. In the usage scenario, two sets of satellites which are located at the same position are set up using a signal simulation source, and each of the satellites broadcasts the B1I and B1C signals; a software receiver tracks the signals of two satellites through two channels, respectively, and outputs observations for the performance evaluation and analysis in the next step, wherein the spacing $d_1$ of early and late correlations of B1I signal is set as 1 chip, and the spacing $d_2$ of early and late correlations of B1C signal is set as ½ chip.

A schematic diagram for comparison of carrier thermal noises of the separate processing of B1I signal, the separate processing of B1C signal and the joint processing is illustrated in FIG. 6. As illustrated in FIG. 6, the carrier thermal noise performance of joint processing is better than those of separate processing of two signals, which also means that the power gains of two signals can be obtained simultaneously through the joint processing method.

A schematic diagram for comparison of code thermal noises of the separate processing of B1I signal, the separate processing of B1C signal and the joint processing is illustrated in FIG. 7. As illustrated in FIG. 7, the code thermal noise performance of joint processing is better than those of separate processing of two signals, which means that the power gains of two signals can be obtained simultaneously through the joint processing method.

A schematic diagram for comparison of a code thermal noise and a carrier thermal noise of the joint processing method according to the present application is illustrated in FIG. 8. As illustrated in FIG. 8, the ranging code precision reaches the decimeter level, and the sub-carrier ranging precision the centimeter level, which means that through the construction of a virtual wideband navigation signal, a virtual sub-carrier can be constructed, and through the assistance by the virtual sub-carrier estimation to the code estimation, a significant Gabor bandwidth gain can be achieved and the ranging precision can be upgraded from the decimeter level to the centimeter level.

Gabor bandwidth, as an important index used to characterize a signal's theoretical ranging capability, can be calculated based on its PSD. It is well known that the broader the Gabor bandwidth is, the better the ranging performance that can be achieved. A schematic diagram for comparison of Gabor bandwidth result of the virtual wideband signal and Gabor bandwidth results of B1I, B1C, and BPSK(10) modulation signal is illustrated in FIG. 9. FIG. 9 shows that the Gabor bandwidth of virtual wideband signal is not only significantly greater than those of the B1I and B1C signals as expected, but also greater than the Gabor bandwidth of the conventional wideband signal with BPSK(10) modulation. This indicates the excellent potential for ranging performance of the virtual wideband signal.

As indicated by the theoretical analysis, through joint processing with a virtual wideband signal constructed based on two signals located at adjacent frequencies, by which a full use of the total power of the two signals and, more importantly, a use of the Gabor bandwidth can be enabled so as to improve the ranging precision and reduce the thermal noise error. Significantly, the Gabor gain is far way greater than the power gain, and thus the thermal noise error can be greatly reduced and the ranging precision can be substantially improved.

Embodiments of the present application may be implemented by hardware, software or the combination thereof. In addition, in an aspect of the present application, a computer program including executable instructions to implement the receiving method for navigation signals located at adjacent frequencies according to embodiments of the present application is provided. The program can be stored in storage of any form, such as optical or magnetic readable media, chip, ROM, PROM, or any form of volatile or non-volatile memory device. According to an example of the embodiment of the present application, a machine-readable storage is provided for storing the program.

While various embodiments of the present application have been described above referring to the drawings, it should be understood that they have been presented by way of example only, but not limitation. It will be apparent to those skilled in the art that various changes in form and detail can be made therein without departing from the spirit and scope of the invention.

What is claimed is:

1. A joint receiver for navigation signals located at adjacent frequencies comprising:
   a receiving channel for receiving a first navigation signal and a second navigation signal which are located at adjacent frequencies;
   a processor for calculating a frequency estimation of a virtual wideband navigation signal constructed based on the first navigation signal and the second navigation signal, and obtaining a delay estimation of navigation based on the frequency estimation, wherein the virtual wideband navigation signal is an asymmetric navigation signal having a virtual carrier and a virtual sub-carrier, wherein the frequency estimation includes a virtual carrier frequency estimation, a virtual sub-carrier frequency estimation and a code frequency estimation of the virtual wideband navigation signal;
   a first correlator for generating first navigation signal correlations through correlating a local replica of the first navigation signal against the first navigation signal as received;
   a second correlator for generating second navigation signal correlations through correlating a local replica of the second navigation signal against the second navigation signal as received; and
   a joint processor for pre-processing the first navigation signal correlations and the second navigation signal correlations to compensate an asymmetry of the virtual wideband navigation signal; combining the pre-processed correlations to decouple the virtual carrier and the virtual sub-carrier of the virtual wideband navigation signal; and obtaining the virtual carrier frequency estimation, the virtual sub-carrier frequency estimation and the code frequency estimation of the virtual wideband navigation signal based on the combined pre-processed correlations.

2. The receiver as claimed in claim 1, wherein a central frequency of the virtual carrier of the virtual wideband navigation signal is determined by an average of a received frequency of the first navigation signal and a received frequency of the second navigation signal, a central frequency of the virtual sub-carrier of the virtual wideband navigation signal is determined by half of the received frequency spacing between the first navigation signal and the second navigation signal, and a lower band of the virtual wideband navigation signal modulated with the first navigation signal is asymmetric with an upper band of the virtual wideband navigation signal modulated with the second navigation signal.

3. The receiver as claimed in claim 1, wherein the virtual carrier frequency estimation, the virtual sub-carrier frequency estimation and the code frequency estimation obtained by the joint processor is fed back to the first correlator and the second correlator for generating the local replica of the first navigation signal and the local replica of the second navigation signal.

4. The receiver as claimed in claim 1, wherein the joint processor comprises a calculating unit comprising instructions executable for conducting the pre-processing and combining the pre-processing correlations, wherein the pre-processing is conducted through a power compensation to the first navigation signal correlations and the second navigation signal correlations, and the preprocessing is further conducted through performing a message segregation or a sub-code segregation on the first navigation signal correlations and the second navigation signal correlations.

5. The receiver as claimed in claim 1, wherein the joint processor comprises a carrier phase discriminator for performing a phase discrimination of the virtual carrier of the combined pre-processing correlations and a carrier phase filter for filtering a result of the phase discrimination of the virtual carrier to obtain the virtual carrier frequency estimation, and the joint processor comprises a sub-carrier phase discriminator for performing a phase discrimination of the virtual sub-carrier of the combined pre-processing correlations, and a sub-carrier phase filter for filtering a result of the phase discrimination of the virtual sub-carrier to obtain the virtual sub-carrier frequency estimation.

6. The receiver as claimed in claim 1, wherein the joint processor comprises a code phase discriminator for performing a first code phase discrimination on the first navigation signal correlation and performing a second code phase discrimination on the second navigation signal correlation, and a result of the first code phase discrimination and a result of the second code phase discrimination are combined by the joint processor and filtered by a code filter to obtain the code frequency estimation of the virtual wideband navigation signal.

7. The receiver as claimed in claim 6, wherein the result of the first code phase discrimination and the result of the second code phase discrimination are combined by the joint processor according to a code autocorrelation function main peak gradient and an early and late correlation spacing of the first navigation signal and a code autocorrelation function main peak gradient and an early and late correlation spacing of the second navigation signal.

8. The receiver as claimed in claim 1, wherein the first navigation signal and the second navigation signal are a B1I signal and a B1C signal, respectively, which are broadcast in a B1 frequency band in the BeiDou Global Satellite Navigation System and are located at adjacent frequencies.

9. A joint receiving method for navigation signals located at adjacent frequencies comprising:
receiving a first navigation signal and a second navigation signal which are located at adjacent frequencies; and
calculating a frequency estimation of a virtual wideband navigation signal constructed based on the first navigation signal and the second navigation signal, and obtaining a delay estimation of navigation based on the frequency estimation, wherein the virtual wideband navigation signal is an asymmetric navigation signal having a virtual carrier and a virtual sub-carrier, wherein the frequency estimation comprises a virtual carrier frequency estimation, a virtual sub-carrier frequency estimation and a code frequency estimation of the virtual wideband navigation signal;
obtaining first navigation signal correlations through correlating a local replica of the first navigation signal against the first navigation signal as received;
obtaining second navigation signal correlations through correlating a local replica of the second navigation signal against the second navigation signal as received; and
pre-processing the first navigation signal correlations and the second navigation signal correlations to compensate an asymmetry of the virtual wideband navigation signal; combining the pre-processed correlations to decouple the virtual carrier and the virtual sub-carrier of the virtual wideband navigation signal; and obtaining the virtual carrier frequency estimation, the virtual sub-carrier frequency estimation and the code frequency estimation of the virtual wideband navigation signal based on the combined pre-processed correlations,
wherein the method is performed by a receiver comprising a receiving channel and a processor.

10. The receiving method as claimed in claim 9, wherein a central frequency of the virtual carrier of the virtual wideband navigation signal is determined by an average of a received frequency of the first navigation signal and a received frequency of the second navigation signal, a central frequency of the virtual sub-carrier of the virtual wideband navigation signal is determined by half of the received frequency spacing between the first navigation signal and the second navigation signal, a lower band of the virtual wideband navigation signal modulated with the first navigation signal is asymmetric with an upper band of the virtual wideband navigation signal modulated with the second navigation signal.

11. The receiving method as claimed in claim 9, wherein the pre-processing includes conducting a power compensation and a message/sub-code segregation to the first navigation signal correlations and the second navigation signal correlations.

12. The receiving method as claimed in claim 9, further comprising: performing a phase discrimination on the combined pre-processing correlations and filtering results of the phase discrimination to obtain the virtual carrier frequency estimation and the virtual sub-carrier frequency estimation.

13. The receiving method as claimed in claim 9, further comprising: performing a first code phase discrimination on the first navigation signal correlation, performing a second code phase discrimination on the second navigation signal correlation, and combining and filtering a result of the first code phase discrimination and a result of the second code phase discrimination to obtain the code frequency estimation of the virtual wideband navigation signal.

14. The receiving method as claimed in claim 13, wherein the result of the first code phase discrimination and the result of the second code phase discrimination are combined according to a code autocorrelation function main peak gradient and an early and late correlation spacing of the first navigation signal and a code autocorrelation function main peak gradient and an early and late correlation spacing of the second navigation signal.

15. The receiving method as claimed in claim 9, wherein the first navigation signal and the second navigation signal are B1I signal and B1C signal, respectively, which are broadcast at adjacent frequencies in B1 frequency band in the BeiDou Global Satellite Navigation System.

16. A non-transitory machine-readable storage storing machine executable instructions, wherein the machine executable instructions are executable by a processor to:
receive through a receiving channel a first navigation signal and a second navigation signal which are located at adjacent frequencies;
calculate a frequency estimation of a virtual wideband navigation signal constructed based on the first navigation signal and the second navigation signal, and obtain a delay estimation of navigation based on the frequency estimation, wherein the virtual wideband navigation signal is an asymmetric navigation signal having a virtual carrier and a virtual sub-carrier, wherein the frequency estimation comprises a virtual carrier frequency estimation, a virtual sub-carrier frequency estimation and a code frequency estimation of the virtual wideband navigation signal;

obtain first navigation signal correlations through correlating a local replica of the first navigation signal against the first navigation signal as received;
obtain second navigation signal correlations through correlating a local replica of the second navigation signal against the second navigation signal as received; and
pre-process the first navigation signal correlations and the second navigation signal correlations to compensate an asymmetry of the virtual wideband navigation signal; combining the pre-processed correlations to decouple the virtual carrier and the virtual sub-carrier of the virtual wideband navigation signal; and obtaining the virtual carrier frequency estimation, the virtual sub-carrier frequency estimation and the code frequency estimation of the virtual wideband navigation signal based on the combined pre-processed correlations.

* * * * *